US011320795B2

(12) United States Patent
Niu et al.

(10) Patent No.: US 11,320,795 B2
(45) Date of Patent: May 3, 2022

(54) INFORMATION ACQUISITION SYSTEM AND POSITIONING DEVICE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Hai-Yang Niu, Zhengzhou (CN); Hai-Yang Ma, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 315 days.

(21) Appl. No.: 16/693,686

(22) Filed: Nov. 25, 2019

(65) Prior Publication Data

US 2021/0063982 A1    Mar. 4, 2021

(30) Foreign Application Priority Data

Aug. 29, 2019 (CN) .......................... 201910810787.0

(51) Int. Cl.
*B65G 43/08* (2006.01)
*B65G 47/22* (2006.01)
*G05B 19/042* (2006.01)

(52) U.S. Cl.
CPC ........... *G05B 19/042* (2013.01); *B65G 43/08* (2013.01); *B65G 47/22* (2013.01); *G05B 2219/2621* (2013.01)

(58) Field of Classification Search
None
See application file for complete search history.

(56) References Cited

U.S. PATENT DOCUMENTS

| | | | | |
|---|---|---|---|---|
| 4,296,590 A * | 10/1981 | Focke | ..................... | B65G 47/32 198/419.1 |
| 5,070,992 A * | 12/1991 | Bonkowski | .......... | B65G 47/088 198/419.1 |
| 6,766,628 B2 * | 7/2004 | Guidetti | ................ | B65B 35/405 198/419.2 |
| 9,376,268 B2 * | 6/2016 | Schiavina | ............... | B65G 37/00 |
| 10,661,999 B2 * | 5/2020 | Faust | ................... | B65G 47/261 |

* cited by examiner

*Primary Examiner* — Kavel Singh
(74) *Attorney, Agent, or Firm* — ScienBiziP, P.C.

(57) ABSTRACT

An information acquisition system includes a transmission device configured to transport a carrier carrying a number of products, an information acquisition device configured to obtain identification information of a corresponding one of the plurality of products when the carrier stops moving, a control device, and a positioning device. The positioning device includes a positioning member, a number of elastic members, a number of blocking members spaced apart and mounted on the positioning member, and a driving member fixedly coupled to the positioning member and configured to drive the positioning member to move telescopically between an extended position and a retracted position. When the positioning member is in the extended position, one of the blocking members blocks the carrier from moving. When the positioning member is in the retracted position, the blocking member that was blocking the carrier unblocks the carrier to allow the carrier to move.

12 Claims, 3 Drawing Sheets

(1)

INFORMATION ACQUISITION SYSTEM AND POSITIONING DEVICE

FIELD

The subject matter herein generally relates to an information acquisition system and a positioning device.

BACKGROUND

Generally, products include identification information which need to be recorded. The products are generally placed on a carrier transported on a conveyor belt. In the related art, the identification information is obtained by a scanner, which is controlled by a servo moving device to move above the products to scan the identification information. However, servo mobile devices are costly and are not conducive to reducing production costs.

BRIEF DESCRIPTION OF THE DRAWINGS

Implementations of the present disclosure will now be described, by way of embodiments, with reference to the attached figures.

DETAILED DESCRIPTION

Figure 1:
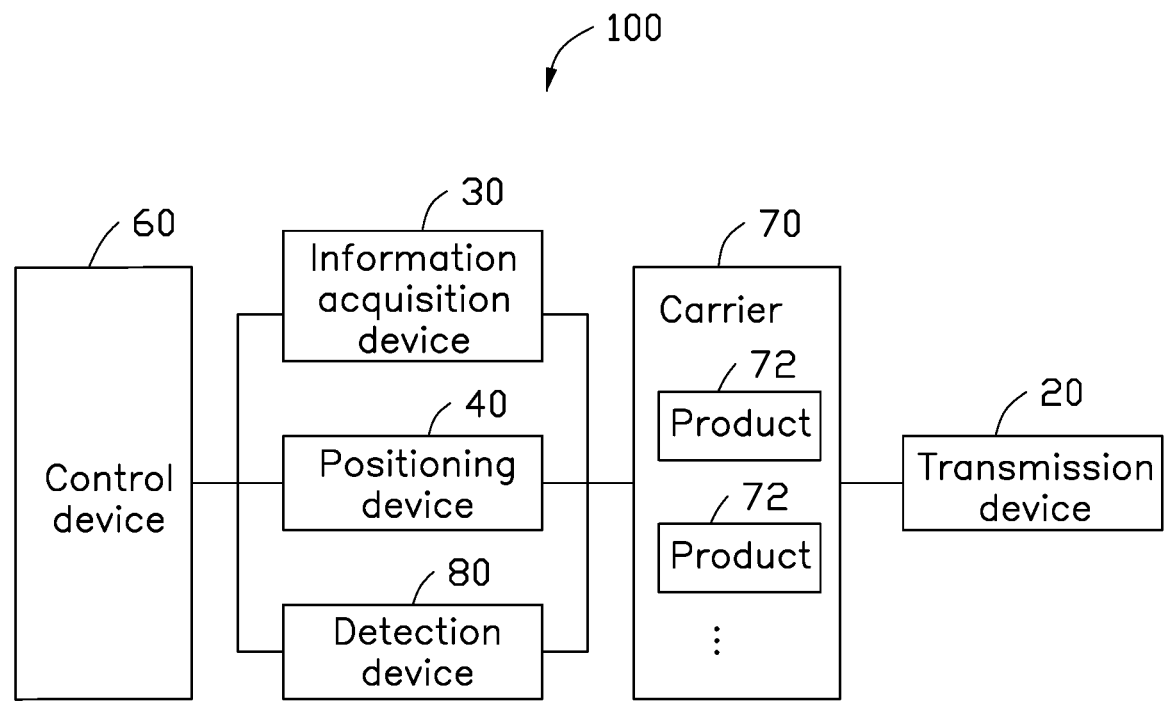
FIG. 1 is a schematic diagram of an embodiment of an information acquisition system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of an information acquisition system 100 including a transmission device 20, an information acquisition device 30, a positioning device 40, and a control device 60.

Figure 2:
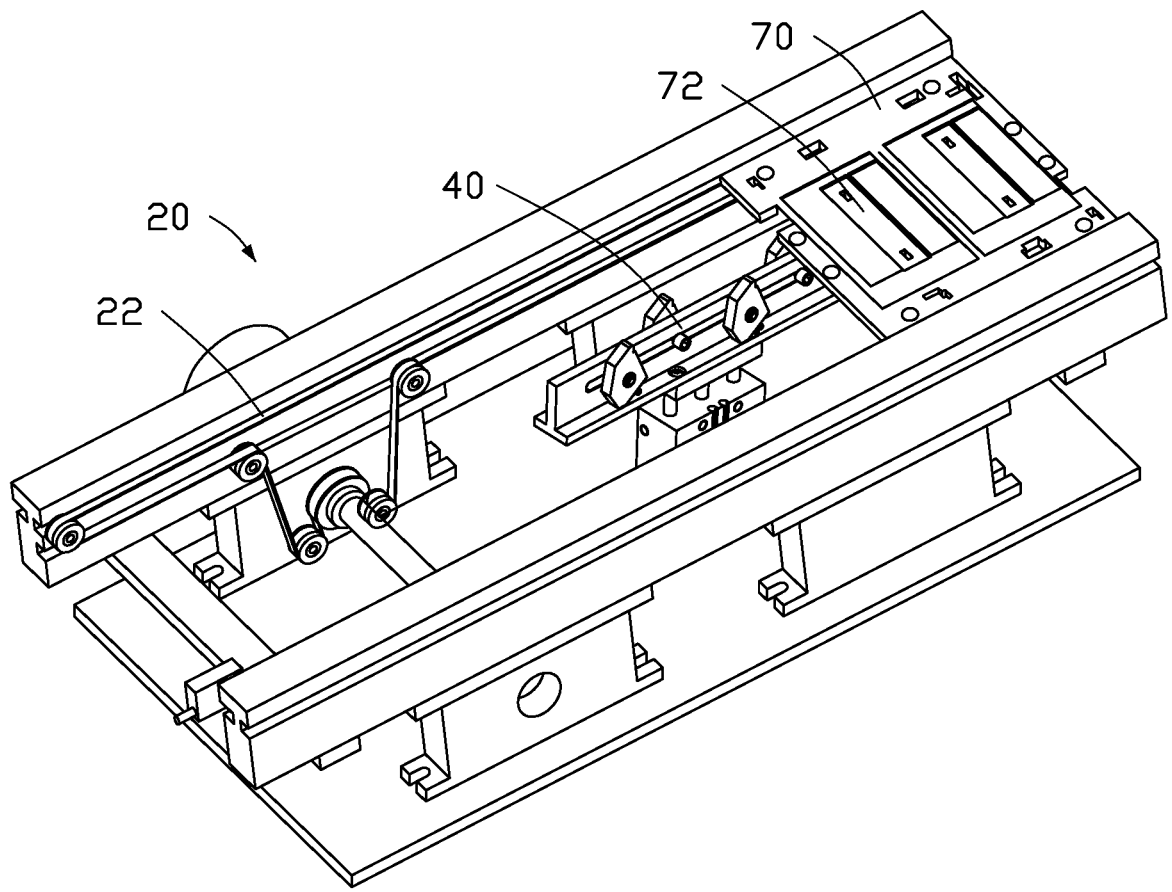
FIG. 2 is an isometric view of a transmission device of the information acquisition system in FIG. 1.

As shown in FIG. 2, the transmission device 20 is used to transport a carrier 70. The carrier 70 is used to carry a plurality of products 72. Each of the plurality of products 72 has identification information of the product 72. The products 72 may be the same or different. In one embodiment, the transmission device 20 includes two belts 22 arranged in parallel. The carrier 70 is placed on the two belts 22. The carrier 70 is transported by transmission of the belts 22.

The information acquisition device 30 is located above the transmission device 20 for acquiring identification information of the products 72 when the carrier 70 stops moving. In one embodiment, the information acquisition device 30 is a scanner that scans the identification information on the products 72 and transmits the identification information to a server (not shown) communicatively coupled to the scanner for storage.

Figure 3:
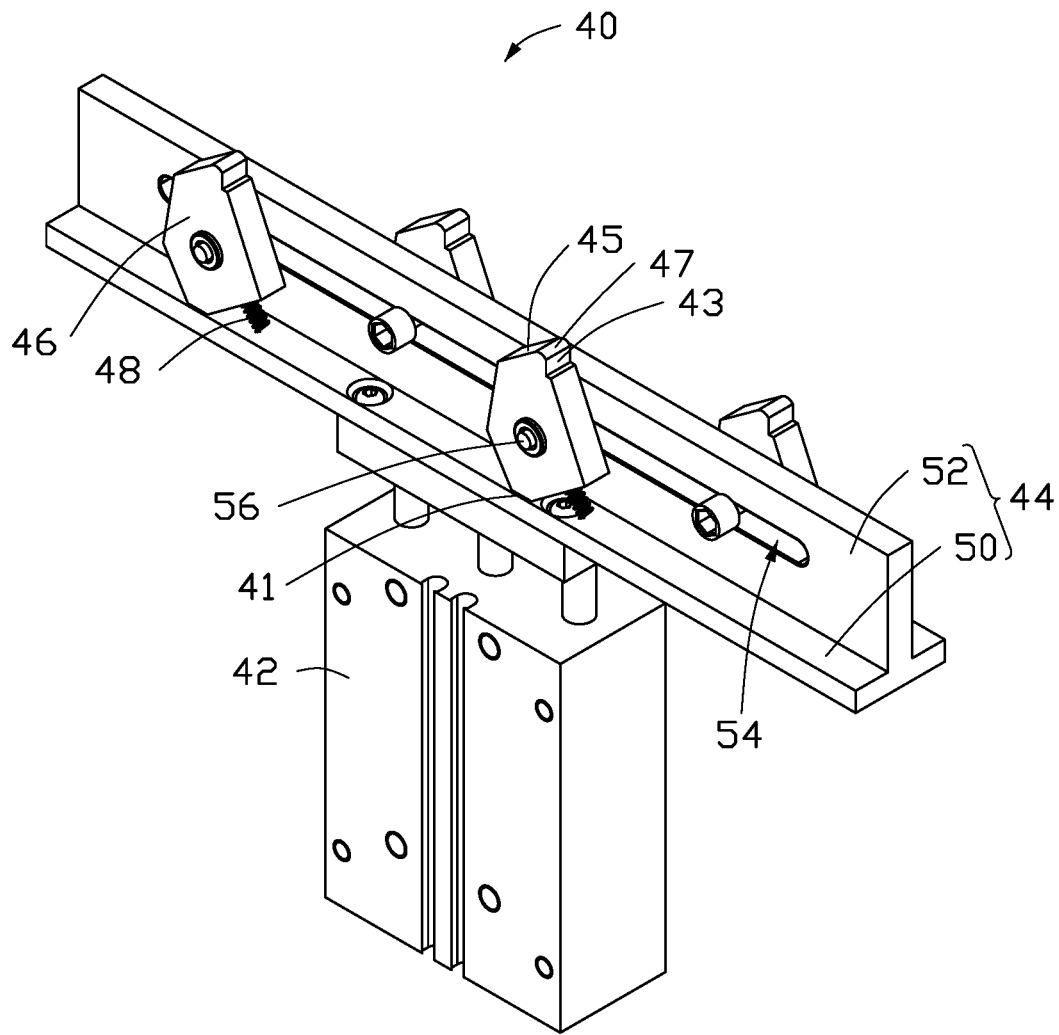
FIG. 3 is an isometric view of a positioning device of the information acquisition system in FIG. 1.

As shown in FIG. 3, the positioning device 40 includes a driving member 42, a positioning member 44, a plurality of blocking members 46, and a plurality of elastic members 48. The driving member 42 is fixedly connected to the positioning member 44 for driving the positioning member 44 to move telescopically between an extended position and a retracted position. In one embodiment, the driving member 42 is a linear motion cylinder, and the elastic member 48 is a coil spring.

The blocking members 46 are spaced apart on the positioning member 44. When the positioning member 44 is in the extended position, one of the plurality of blocking members 46 blocks the carrier 70 from moving.

The information acquisition device 30 is located above the transmitting device 20 for acquiring the identification information of the products 72 when the carrier 70 stops on the transmitting device 20. The information acquisition device 30 can be a scanner that scans the identification information on the product 72 and transmits the identification information to a server.

In one embodiment, the information acquisition system 100 further includes a detection device 80 for detecting whether the carrier 70 is stopped on the transmission device 20. The information acquisition device 30 determines whether to acquire the identification information of the product 72 based on a detection result of the detection device 80. The detecting device 80 may include an image acquisition device (not shown) and an image analyzing device (not shown). The image acquisition device continuously acquires an image above the carrier 70, and the image analyzing device determines whether the carrier 70 stops by analyzing a plurality of consecutive images. In another embodiment, the information acquisition device 30 is controlled manually by an operator, such that when the carrier 70 stops moving, the operator activates a switch of the information acquisition device 30 to acquire the identification information of the product 72.

When the information acquisition device 30 acquires the identification information of the product 72, the control device 60 controls the driving member 42 to drive the positioning member 44 to move to the retracted position and then move to the extended position. When the positioning member 44 is moved to the retracted position, the blocking member 46 that was blocking the carrier 70 is moved below the carrier 70, and the carrier 70 moves to a next adjacent blocking member 46. When the positioning member 44 moves from the retracted position to the extended position, the blocking member 46 that was blocking the carrier 70 is pressed by the carrier 70 to cause the corresponding elastic member 48 to deform until the carrier 70 completely passes over the blocking member 46. When the carrier 70 completely passes over the blocking member 46, the blocking member 46 is reset by a restoring force of the elastic member 48.

In one embodiment, a spacing of the plurality of blocking members 46 is equal to a spacing of the identification information on the products 72. In this way, when the carrier 70 is blocked by each of the blocking members 46, the information acquisition device 30 faces the identification information of the corresponding one of the products 72, thereby accurately obtaining the identification information. In other embodiments, since an information acquisition range of the information acquisition device 30 is larger than a size of the identification information on the product 72, the spacing of the plurality of blocking members 46 may be different than the spacing of the identification information on the products 72.

A quantity of the blocking members 46 is not less than a quantity of the products 72 carried on the carrier 70. When the quantity of the blocking members 46 is equal to the quantity of the products 72 carried on the carrier 70, when the carrier 70 is transported by the transmission device 20 to a last one of the blocking members 46, the information acquisition device 30 acquires the identification information of the last product 72. When the quantity of the blocking members 46 is greater than the quantity of the products 72 carried on the carrier 70 and the information acquisition device 30 acquires the identification information of the last product 72, the control device 60 controls the positioning member 44 to move to the retracted position until the carrier 70 passes over all of the blocking members 46, and then controls the positioning member 44 to move to the extended position.

In one embodiment, the positioning member 44 includes a fixing plate 50 and a positioning plate 52 perpendicularly fixed to the fixing plate 50. The fixing plate 50 is fixedly connected to the driving member 42. The positioning plate 52 defines a positioning slot 54 extending in a direction perpendicular to a moving direction of the positioning member 44. A plurality of fixing shafts 56 are spaced apart and movably received in the positioning slot 54. Each of the plurality of blocking members 46 is rotationally fixed on a corresponding one of the plurality of fixing shafts 56 in a one-to-one manner, and the plurality of blocking members 46 are located on two sides of the positioning plate 52. Each of the blocking members 46 includes a resisting surface 41, a blocking surface 43, a wedge surface 45, and a top portion 47. The resisting surface 41 is located at one side of the positioning slot 54, and the blocking surface 43 and the wedge surface 45 are located at another side of the positioning slot 54. The top portion 47 is connected between the blocking surface 43 and the wedge surface 45. The elastic members 48 are obliquely connected between the fixing plate 50 and the corresponding blocking members 46.

When the carrier 70 is blocked by the blocking member 46, the carrier 70 abuts against the blocking surface 43 to deform the corresponding elastic member 48, the fixing shaft 56 moves along the positioning slot 54, and the blocking member 46 rotates about the fixing shaft 56. The carrier 70 stops moving when a tensile force of the elastic member 48 is sufficient to block the carrier 70 from moving. The resisting surface 41 resists against the fixed plate 50 when the carrier 70 is stopped.

When the positioning member 44 moves from the retracted position to the extended position, the blocking member 46 located under the carrier 70 compresses the elastic member 48 under the resistance of the carrier 70, so that the fixing shaft 56 moves in a direction opposite to a movement direction of the carrier 70 and rotates the top portion 47 about the fixing shaft 56, thereby lowering a height of the top portion 47 in a direction in which the positioning member 44 moves, and the blocking member 46 is pressed by the carrier 70. The elastic member 48 provides an elastic force to reset the blocking member 46 when the carrier 70 passes over the blocking member 46.

The plurality of blocking members 46 of the positioning device 40 sequentially block the carrier 70, so that one information acquisition device 30 located above the carrier 70 can sequentially acquire the identification information of the plurality of products 72 on the carrier 70. Compared to the related art, the information acquisition system 100 reduces operation costs.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A positioning device comprising:
a positioning member;
a plurality of elastic members;
a plurality of blocking members spaced apart and mounted on the positioning member;
a driving member fixedly coupled to the positioning member and configured to drive the positioning member to move telescopically between an extended position and a retracted position; wherein:
each of the plurality of elastic members is coupled between a corresponding one of the blocking members and the positioning member;
when the positioning member is moved from the retracted position to the extended position, one of the plurality of blocking members blocks a carrier from moving;
when the positioning member is moved from the extended position to the retracted position, the blocking member that was blocking the carrier unblocks the carrier to allow the carrier to move; and
when the positioning member is moved from the retracted position to the extended position, the blocking member that was blocking the carrier is resisted by the carrier and causes the corresponding elastic member to compress, and a restoring force of the elastic member restores a position of the blocking member after the carrier moves past the blocking member;
wherein the positioning member comprises a fixing plate and a positioning plate; and:
the fixing plate is fixedly coupled to the driving member;
the positioning plate defines a positioning slot extending in a direction perpendicular to a movement direction of the positioning plate;
a number of fixing shafts are spaced apart and movably received in the positioning slot;
each of the blocking members is rotationally fixed on one fixing shaft in a one-to-one manner;
the blocking members are located on two sides of the positioning plate; and
the elastic members are coupled between the fixing plate and the blocking members.

2. The positioning device of claim 1, wherein:
the positioning plate is perpendicularly fixed to the fixing plate.

3. The positioning device of claim 1, wherein:
the plurality of elastic members are obliquely coupled between the fixing plate and the plurality of blocking members.

4. The positioning device of claim 1, wherein:
each of the blocking members comprises a resisting surface, a blocking surface, a wedge surface, and a top portion;
the resisting surface is located at one side of the positioning slot, and the blocking surface and the wedge surface are located at another side of the positioning slot;
the top portion is coupled between the blocking surface and the wedge surface;
the blocking surface is configured to resist against the carrier;
when the carrier stops moving, the resisting surface resists against the fixing plate.

5. An information acquisition system comprising:
a transmission device configured to transport a carrier carrying a plurality of products;
an information acquisition device configured to obtain identification information of a corresponding one of the plurality of products when the carrier stops moving;
a control device; and
a positioning device comprising a positioning member, a plurality of elastic members, a plurality of blocking members spaced apart and mounted on the positioning member, and a driving member fixedly coupled to the positioning member and configured to drive the positioning member to move telescopically between an extended position and a retracted position; wherein:
each of the plurality of elastic members is coupled between a corresponding one of the blocking members and the positioning member;
when the positioning member is moved from the retracted position to the extended position, one of the plurality of blocking members blocks the carrier from moving;
when the positioning member is moved from the extended position to the retracted position, the blocking member that was blocking the carrier unblocks the carrier to allow the carrier to move;
when the positioning member is moved from the retracted position to the extended position, the blocking member that was blocking the carrier is resisted by the carrier and causes the corresponding elastic member to compress, and a restoring force of the elastic member restores a position of the blocking member after the carrier moves past the blocking member; and
each time when the information acquisition device obtains the identification information of one of the plurality of products, the control device controls the driving member to move the positioning member to the retracted position and then move to the extended position;
wherein the positioning member comprises a fixing plate and a positioning plate;
the fixing plate is fixedly coupled to the driving member;
the positioning plate defines a positioning slot extending in a direction perpendicular to a movement direction of the positioning plate;
a number of fixing shafts are spaced apart and movably received in the positioning slot;
each blocking member is rotationally fixed on a fixing shaft in a one-to-one manner;
the blocking members are located on two sides of the positioning plate; and
the elastic members are coupled between the fixing plate and the blocking members.

6. The information acquisition system of claim 5, wherein:
the information acquisition device is a scanner and sends the obtained identification information to a server communicatively coupled to the scanner.

7. The information acquisition system of claim 5, further comprising a detection device configured to detect whether the carrier on the transmission device has stopped; wherein:
the information acquisition device determines whether to acquire the identification information of the product based on a detection result of the detection device.

8. The information acquisition system of claim 5, wherein:
a quantity of the blocking members is equal to a quantity of the products on the carrier.

9. The information acquisition system of claim 5, wherein:
a spacing of the plurality of blocking members is equal to a spacing of the identification information on the products.

10. The information acquisition system of claim 5, wherein:
the positioning plate is perpendicularly fixed to the fixing plate.

11. The information acquisition system of claim 5, wherein:
the plurality of elastic members are obliquely coupled between the fixing plate and the plurality of blocking members.

12. The information acquisition system of claim 5, wherein:
each of the blocking members comprises a resisting surface, a blocking surface, a wedge surface, and a top portion;
the resisting surface is located at one side of the positioning slot, and the blocking surface and the wedge surface are located at another side of the positioning slot;
the top portion is coupled between the blocking surface and the wedge surface;
the blocking surface is configured to resist against the carrier;
when the carrier stops moving, the resisting surface resists against the fixing plate.

* * * * *